United States Patent [19]

Fowler

[11] 4,114,288
[45] Sep. 19, 1978

[54] BULK CURE TOBACCO BARN WITH IMPROVEMENTS IN CONSTRUCTION FOR OPTIMIZING HEATING EFFICIENCY

[76] Inventor: Joe W. Fowler, Iron Works Rd., Rte. 2, Box 39, Reidsville, N.C. 27320

[21] Appl. No.: 732,481

[22] Filed: Oct. 14, 1976

[51] Int. Cl.² ............................................. F26B 19/00
[52] U.S. Cl. ......................................... 34/93; 34/210; 34/218; 34/86; 432/500
[58] Field of Search ................... 34/93, 202, 210, 211, 34/218, 225, 50, 86, 51, 54; 432/500, 172, 176, 189, 192, 222, 223; 98/6, 8, 10, 52–56; 165/66, DIG. 2, DIG. 12; 62/239, 240

[56] References Cited

U.S. PATENT DOCUMENTS

| | | | |
|---|---|---|---|
| 2,184,473 | 12/1939 | Scanlan | 34/225 |
| 2,529,621 | 11/1950 | Mayo | 432/176 |
| 2,688,476 | 9/1954 | Mayo | 34/93 |
| 3,231,986 | 2/1966 | Touton | 34/93 |
| 3,380,174 | 4/1968 | McClaren | 34/50 |
| 3,829,285 | 8/1974 | Beck | 432/223 |
| 3,859,735 | 1/1975 | Katterjohn, Jr. | 34/86 |
| 3,910,757 | 10/1975 | Taylor et al. | 432/500 |
| 4,069,593 | 1/1978 | Huang | 34/93 |

*Primary Examiner*—John J. Camby
*Assistant Examiner*—Henry C. Yuen

[57] ABSTRACT

Incoming fresh air, which is introduced for heating in the furnace of a bulk curing barn for tobacco, travels the length of the barn in heat exchange relationship in a direction opposite to that of the hot, moist exhaust air leaving the curing chamber. The incoming fresh air is further preheated by means of a solar roof immediately beneath which the fresh air flows on its way to the furnace. The curing chamber itself is made substantially air tight, is insulated, and has the floor thereof elevated above the ground, thereby preventing heat loss as much as possible. The barn is sometimes portable so that it can be loaded with tobacco adjacent or near the tobacco field and moved to whatever location desired for the curing operation.

In a preferred embodiment, additional amounts of fresh air are introduced beneath the edges of a corrugated surface which forms the solar roof, which air streams are heated both by the solar furnace from above, and also by the hot exhaust air in an exit duct immediately therebeneath.

12 Claims, 4 Drawing Figures

BULK CURE TOBACCO BARN WITH IMPROVEMENTS IN CONSTRUCTION FOR OPTIMIZING HEATING EFFICIENCY

BACKGROUND OF THE INVENTION

The flue curing of tobacco has evolved through several stages as far as the development of techniques is concerned. Initially, of course, curing was done in the conventional "tobacco barns" in which tobacco was strung on tobacco sticks, hung across rafters in the barn, and a fire was kept burning in the lower area of the barn with the heat rising through the tobacco and escaping through a roof opening. Improvements were made to this process to the extent that sheds were manufactured which included a gas or oil furnace which heated incoming fresh air and circulated it around and through the tobacco, with a portion of the heated air being recirculated, and a portion of it being drawn off as it became saturated with moisture from the tobacco (tobacco containing about 80° water when it is placed in the barns). There have been several such attempts in the "bulk curing" of tobacco to use furnaces which provide heated air which is circulated and recirculated through the tobacco, however, none of these attempts have made very effecutal use of the heat, and of economic thermodynamic principles. For example, the barns are conventionally placed on a concrete slab which is directly in contact with the ground. As a result, the heated air which is usually introduced in the area directly beneath the tobacco first comes into contact with the concrete slab, and a considerable amount of heat is thus lost, necessitating the generation of additional heat than would otherwise be necessary. Additionally, the moist heat that is thrown overboard to make way for incoming amounts of drier heat is done so without any reclamation whatsoever of the heat therein. Even through some of the moist air effectively must be exhausted, the heat that is contained therein is very useful if it can be transferred to the incoming heat. No attempts at such heat reclamation have been made in the prior art to the best of applicant's knowledge.

SUMMARY OF THE PRESENT INVENTION

The present invention, on the other hand, is directed to an improved construction for bulk curing tobacco barns which prevents heat loss, reclaims a considerable amount of heat from the exhaust air before it is discharged, and otherwise preheats the incoming fresh air prior to introduction to the furnace, all of which tend to make for a more efficient operation and reduction of fuel usage during the curing season. This is accomplished by sealing the curing enclosure to the extent possible, providing a thermal barrier between the curing chamber and the ground, providing a heat reclaiming or heat exchange unit atop the the curing chamber through which the incoming air passes in heat exchange relationship with the outgoing hot air, as well as making use of solar energy to pre-heat incoming air. Further, the opening and closing of a damper system for the incoming air is modulated responsive to the moisture content of the air within the enclosure, so that sufficient fresh, dry, heated air is continuously introduced to maintain the moisture content of the air circulating within the enclosure within prescribed limits. Additionally, the enclosure may be mobile, and can be moved around so that it can be loaded in tobacco fields, and subsequently moved to a curing station.

In general, the barn construction which provides such results may include a portable or mobile enclosure, such as the trailer of a tractor-trailer truck, which may be modified according to the present invention. The curing chamber in which the tobacco is deposited includes walls that are well insulated on the sides as well as the top and bottom. A heat exchange means is positioned along the top of the chamber, and a portion of the hot, moist air, which is to be exhausted, rises through openings or vents in the ceiling of the chamber into an air passageway in said heat exchange member, from which they flow in a direction toward the front of the enclosure. The major fresh air inlet is positioned at the front end of the heat exchange means, and the incoming air flows rearwardly (in a direction counter to the flow of hot moist exhaust air) toward the furnace which is located at the rear end of the enclosure. A separating wall of heat conducting material separates the two air streams, yet provides a heat conducting medium therebetween. Additionally, the roof of the heat exchange means is provided with a solar energy collecting surface, so that additional heat is introduced into the incoming fresh air. Auxiliary, minor incoming air inlets exist between the corrugated roof of the heat exchange means and the top wall of the plenum which encloses the exit air passge. The major air flow path of the incoming air causes, by the Venturi effect, additional portions of air to be drawn into the incoming air stream through the air spaces between the corrugations and the top wall of the exit air plenum. Such incoming air is heated both from below by the outgoing hot air, and from above by the solar collecting roof.

Other features of the improved curing barn include a damper system which modulates the amount of incoming fresh air responsive to the condition of the air within the curing chamber. When the moisture content of such air exceeds predetermined limits, the fresh air dampers are opened more to allow more dry air into the system, thereby causing more moist air to leave. Additionally, a differential pressure gauge is installed within the curing chamber to measure the pressure above and below the bulk tobacco within the chamber to determine if enough resistance is being offered to the passage of air therethrough (i.e., if there are air leaks between containers, if the tobacco is packed too tightly, etc.). Where the differential in pressure above and below the tobacco is outside certain limits determined by the weight of the contents of each container, the farmer can immediately make the necessary adjustments to insure a good cure.

It is therefore an object of the present invention to provide an improved barn for the bulk curing of tobacco which may be more efficiently operated than those heretofore known.

It is another object of the present invention to provide an improved barn for the bulk curing of tabacco of the type described in which the incoming fresh air is preheated by various means before introduction into the furnace, thereby reducing the amount of fuel necessary to operate the curing barn throughout the curing season.

Another object of the present invention is to provide an improved curing chamber for the bulk curing of tobacco including a heat exchange device mounted on the roof or solar exposed surface thereof which preheats the incoming air both by its passage in heat exchange relationship with the hot, moist exhaust air, and by means of solar energy.

Other objects and a fuller understanding of the invention will become apparent from reading the following detailed description of a preferred embodiment along with the accompanying drawings in which.

DETAILED DESCRIPTION OF THE PREFERRED EMBODIMENT

Figure 1:
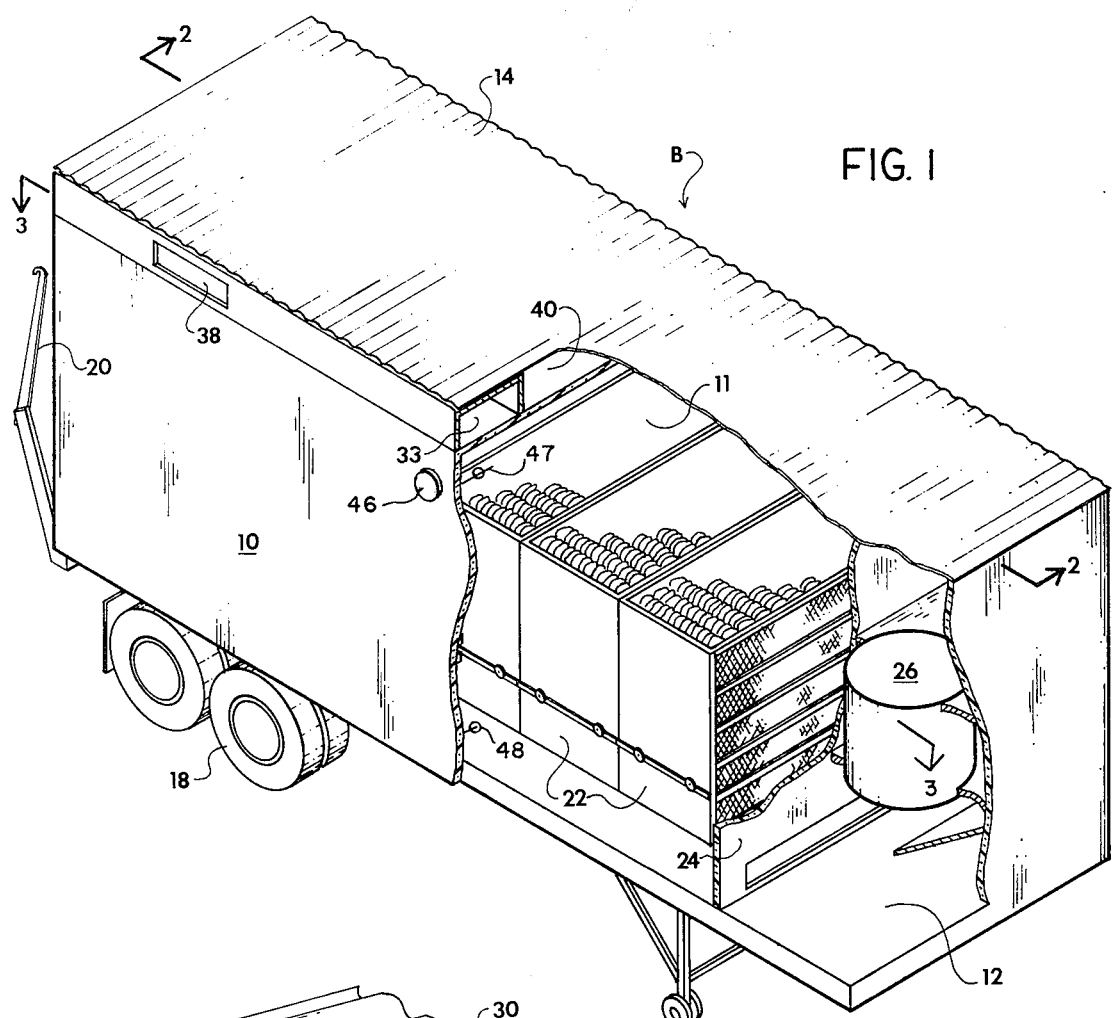
FIG. 1 is a perspective view with a portion thereof cut away for the purpose of illustrating the interior of the apparatus for the bulk curing of tobacco according to the present invention.

Turning now to the drawings, and particularly to FIG. 1, there is illustrated the curing barn B according to the present invention which includes a substantially air tight, or sealed, curing chamber 10 in which the tobacco containers 22 are emplaced for curing of the tobacco. The curing chamber or enclosure 10 makes up or forms the major portion of the length of the barn B, however, at the extreme rear end thereof the control chamber 12 is provided in which the furnace 26, blowers and associated gauges and other control equipment are located. A heat exchange means 14 is mounted on the roof of curing chamber 11 for reasons to be discussed hereinafter.

Figure 2:
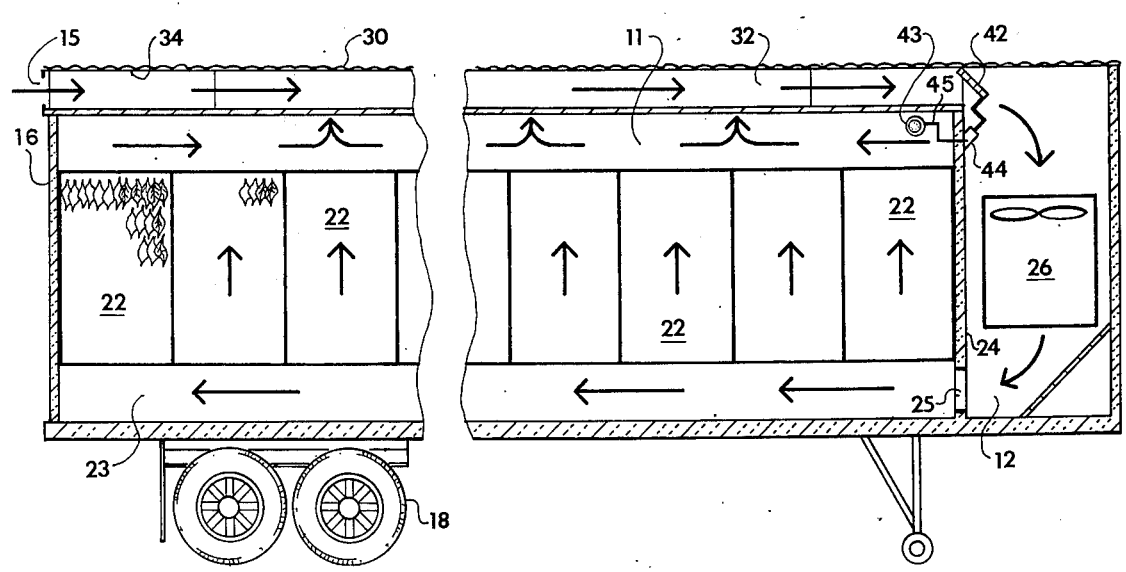
FIG. 2 is a sectional view of the curing chamber taken substantially along lines 2—2 in FIG. 1.

In general, in one preferred embodiment of the barn B, a mobile enclosure such as the trailer portion of a tractor trailer truck is utilized which includes conventional rear doors 16, wheels 18 and the like. As illustrated in FIG. 1, a portion of a specially adapted loading apparatus 20 is illustrated, however, other than the fact that the loading apparatus 20 contains a scale incorporated therein for weighing each container 22, that apparatus is part of a loading system which is not the subject of the present invention. A wall 24 separates the control chamber 12 from the curing chamber 11. The only communication therebetween is a heated fresh air inlet 25, as illustrated in FIG. 2, through which the incoming heated air is introduced into the curing chamber 11. Although a mobile enclosure is illustrated, permanent installations are also well within the scope of this invention; in such cases, however, a thermal barrier is provided between the floor of the curing chamber 11 and the ground.

Within the curing chamber 11, the containers 22 are emplaced either in a conventional manner, or according to a special loading system. In any event, the containers are supported by rails along the side or otherwise so that there is an air space both below and above the containers of tobacco for the circulation of air in the carrying out of the curing process. Containers 22 may either be bulk containers or racks and either of conventinal or special design.

During the curing process, as the incoming air which is introduced from the furnace 26 through inlet 25 into the air space 23 below the containers 22 and repeatedly circulated through the tobacco, it picks up more and more moisture to such an extent that the air eventually becomes so saturated as to be unable to remove any more moisture from the tobacco. Some of of the air then must be replaced by incoming, drier air, so that there is sufficient dryness in the incoming air to remove additional moisture from the tobacco. According to the present invention, this is a continuous process in which some incoming air is always introduced, and the amount depends upon the humidity condition of the air within the curing chamber 11 which is continuously monitored.

Figure 4:
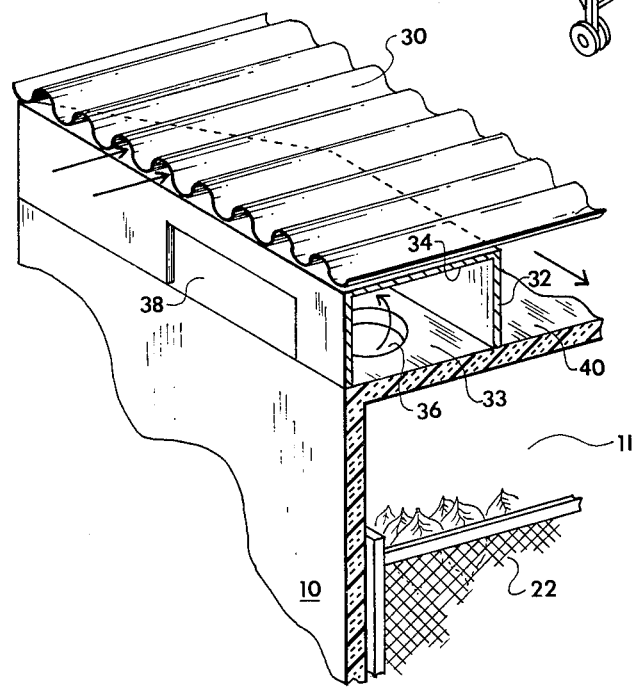
FIG. 4 is an enlarged, perspective view, with parts broken away of the side and upper portion of the curing chamber, illustrating the manner in which the heat exchange means is mounted.
Figure 3:
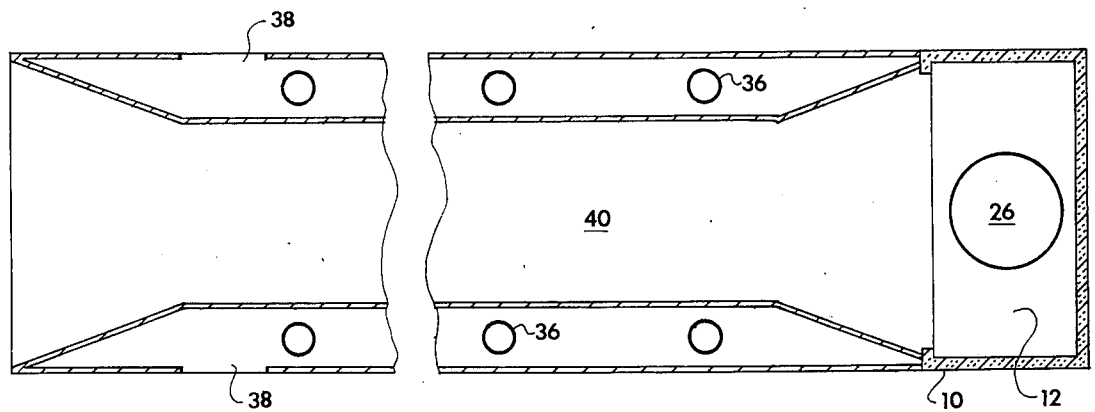
FIG. 3 is a sectional view of the heat exchange portion taken substantially along lines 3—3 in FIG. 1.

As additional incoming air is introduced to curing chamber, some of the moist air is forced through outlet ports 36 in the upper side edges of the enclosure 10 into the heat exchange means 14. An exhaust air exit duct 33 is formed by aluminum or other heat conducting walls 32, 34 as illustrated in FIG. 4. So arranged, the air leaving the curing chamber 11 through outlet ports 36 exits the barn B through a vent 38 positioned at the front end of the barn as illustrated in FIG. 1. An identical exhaust air duct 33 and outlet vent 38 is formed on the other side of the enclosure from that illustrated in FIG. 4, however, for purposes of explanation it is considered that one illustration is sufficient. If desired the surface of the walls 32, 34 may be roughened or provided with ridges to cause turbulence in the air which leads to better heat transfer.

Turning now to a description of the incoming air, there is provided a fresh air inlet 15 at the front end of the heat exchange means 14 through which fresh, relatively dry, atmospheric air is introduced. The incoming air passes between the walls 32 forming the exhaust ducts 33 moving in a direction opposite that of the air in the exhaust ducts. As described hereinabove, the exhaust ducts formed by walls 32, 34 are formed of a good heat conducting material, so that heat from the exhaust air is reclaimed by the fresh incoming air as it moves down passageway 40 toward the damper system 42 at the rear end of the barn B above the furnace 26.

In addition to absorbing heat from the exhaust ducts 33, the heat exchange means 14 includes a heat absorbing roof 30 or solar exposed surface, which may either be formed from a material which is transparent to high temperature infrared rays (e.g. those from sunlight), such as some of the plastic or fiberglass material, with the surfaces of the exhaust duct walls 32, 34 and the upper surface of the curing chamber 10 painted blank to absorb the incoming heat. Alternatively the surface of the roof 30 itself could be formed from a material such as aluminlum painted black to absorb the heat from the sun. In any event, the material is preferably corrugated with the ridges running in a direction transverse to the longitudinal dimension of the barn B. The roof is secured adjacent the top wall 34 of air duct 33, and small air spaces between the corrugation and top wall 34 allow the introduction of smaller amounts of fresh air which are pulled into the incoming air passageway 40 by movement of air therethrough due to the phenomon known as the "Venturi" effect. As these small air currents pass over upper wall 34 of the exhaust duct 33, they are heated considerably thereby, and therefore tend to elevate even further the temperature of the incoming air stream through passageway 40.

The opening and closing of damper 42 is modulated responsive to the humidity within curing chamber 11. An instrument, such as a humidistat 43, is installed within the curing chamber 11, and electrically connected to solenoid 44 by means of an electrical line 45. The solenoid, in turn, is then operated by the humidistat and connected to the control arm of the dampers for opening and closing as required. A differential pressure gauge 46 is mounted in a visible location on the enclosure 10, and includes pressure sensors 47, 48 of a conventional type connected thereto for measuring the air pressure above and below the containers 22 to determine if proper air flow is occurring.

In operation, the containers 22 of tobacco are filled and loaded within the curing chamber 11 according to known methods. The curing chamber is then sealed and the curing operation begins by activation of the furnace 26 according to practices already known in the industry which includes the steps of conditioning, yellowing, leaf drying, stem drying and ordering of the tobacco by varying the temperature and humidity within the curing chamber. In carrying out these techniques, however, the apparatus of the present invention becomes most useful. As stated hereinbefore, it is necessary to maintain the humidity and heat within the chamber at a desired level. As the air within the curing chamber 11 becomes saturated or picks up sufficient moisture from the tobacco to exceed the desired humidity level, it must be continuously replaced by drier air. As new air in introduced, exhaust air must be removed. This is accomplished by a continuous operation in which air is continually pulled through inlet 15, along passageway 40, through the damper system 42 and into furnace 26. The amount of such air flow varies according to the humidity conditions within curing chamber 11 as described hereinabove. According to well known principals, as new air is introduced through inlet 25, existing air will be forced out of the curing chamber through ports 36, along the exhaust duct 33 toward the front of the barn B and out the vents 38. This exhaust air will preheat the incoming air according to well known heat exchange principals as described hereinabove. Additionally, the incoming air is preheated by the solar energy absorbed by roof 30. Throughout the entire operation, the fact that the enclosure is substantially air tight, the walls insulated, and the floor not only insulated, but also elevated above the ground will tend to provide a higher efficieny of operation. The result is that the curing operation can be performed with approximately 40 percent of the fuel used in systems known heretofore. As fuel prices escalate in our world today, such economies as herein provided even more important to the farmer, as well as providing the farmer with a way to contribute toward fuel economy. Further the resulting tobacco is as good if not better than tobacco cured according to other conventional processes.

Although the apparatus is illustrated as being elongated, with the heat exchange means atop the curing chamber and the furnace 26 at one end, it should be apparent that other arrangements could be used, it only being necessary that the heat absorbing means being exposed to the sun's rays, and that there by a heat exchange path through which the incoming air passes adjacent the hot exhaust air. Further the curing chamber need not be elongated, as it could be square or even circular. It is apparent that various changes and modifications might be made to the apparatus without departing from the scope of the invention, which is to be determined by the following claims.

What is claimed is:

1. An apparatus for the bulk curing of tobacco by means of hot air which is circulated through the tobacco leaves to remove the moisture therefrom comprising:
   (a) a substantially air tight, insulated curing chamber having a furnace chamber positioned separate from, but adjacent one end thereof, a furnace therein, and a heated air ingress from said furnace chamber to said curing chamber, said furnace chamber being otherwise isolated from said curing chamber, and a means for supporting the tobacco in said curing chamber with an air space above and below;
   (b) outlet means for said curing chamber through which a portion of the air from inside said chamber is exhausted;
   (c) a fresh air inlet means communicating with said furnace through which fresh, generally drier air is brought for treatment by said furnace before introduction as a replacement for the air exhausted from said chamber; and
   (d) heat exchange means connecting said fresh air inlet and said furnace, and including a first air passage between said fresh air inlet means and said furnace and at least one second air passage between said outlet means and the atmosphere through which said exhaust air passes, said first and second air passages lying adjacent each other and separated by a heat conducting material having substantially high heat transfer properties.

2. The apparatus according to claim 1 and further including heat absorbing means forming at least a portion of the solar exposed surface of said heat exchange means for absorbing heat from the sun's rays and transmitting such heat to the incoming fresh air.

3. The apparatus according to claim 2 wherein said fresh air inlet is provided at a remote location of said curing chamber from said furnace whereby said incoming air is preheated along its passage between said fresh air inlet and said furnace.

4. The apparatus according to claim 3 wherein said second air passage is formed by an air duct having walls formed of said heat conducting material, said heat absorbing means is provided with corrugations, a portion of said heat absorbing means is mounted atop one of the walls of said air duct, whereby secondary air inlets are provided therebetween and drawn in by said first air passage across said one wall where they absorb additional amounts of heat.

5. The apparatus according to claim 4 wherein said heat absorbing means comprises a black aluminum material.

6. The apparatus according to claim 4 wherein said heat absorbing means is shielded from heat loss by conduction and low temperature radiation by a plastic material transparent to high temperature infrared and substantially opaque to low temperature infrared.

7. The apparatus according to claim 1 and further including a damper system in the path of said fresh air between said inlet and the furnace, and a humidity sensing device mounted in said curing chamber, said damper system being modulated responsive to said humidity sensing device.

8. The apparatus according to claim 1 and further including insulating means for maintaining a thermal barrier between the floor of said curing chamber and the ground.

9. The apparatus according to claim 8 wherein said insulating means comprising wheels mounted on said curing chamber, whereby said apparatus is elevated from the ground and may be moved from place to place.

10. The apparatus according to claim 1 wherein said means for supporting the tobacco includes a plurality of containers, and wherein said apparatus further includes a weighing means associated therewith for determining the weight of each container and a pressure sensing means within said curing chamber for determining the difference in pressure between the area above the tobacco and the area below to determine if proper circulation of air therethrough is being obtained.

11. The apparatus according to claim 1 wherein said curing chamber includes a top wall; said heat exchange means comprises a roof spaced above said top wall, a pair of ducts formed of heat conducting material extending along the opposite edge portions of the area above the curing chamber and below said roof, a central chamber formed by said roof, top wall, and between said ducts and extending along the length of said curing chamber; said outlet means comprising a plurality of openings in said top wall leading into said ducts from said curing chamber and said ducts containing an outlet to the atmosphere near the end of said ducts opposite said furnace chamber; and said fresh air inlet means including at least one inlet from the atmosphre into said central chamber at the end thereof opposite said furnace chamber and an opening at the end nearest the furnace chamber into said furnace chamber whereby said inlet, said central chamber, and said opening into the furnace chamber form said first air passage which extends substantially the entire length of said apparatus.

12. An apparatus for the bulk curing of tobacco by means of hot air which is circulated through the tobacco leaves to remove the moisture therefrom comprising:

(a) a substantially air tight, insulated curing chamber in which said tobacco leaves are supported with an air space below and an air space above;

(b) a furnace means isolated from and outside said curing chamber and adjacent one end thereof;

(c) said curing chamber including a warm air inlet into the space below said tobacco leaves, a warm air conduit means connecting said furnace means and said warm air inlet through which warm air is delivered to said curing chamber, and an exhaust air outlet exiting from the air space above said tobacco leaves through which warm air leaves the curing chamber;

(d) an incoming air passage connecting the atmosphere with the furnace means and extending from a point adjacent the other end of said curing chamber and along a path extending substantially the length of said curing chamber through which fresh air is brought into the furnace for heating and distribution;

(e) at least one outgoing air passage connecting the curing chamber with the atmosphere and lying substantially parallel with said incoming air passage;

(f) a wall means formed of heat conducting material separating said incoming and outgoing air passages, but permitting conduction of heat therebetween, whereby said incoming air is preheated before delivery to said furnace by the warm moist air exhausted from said curing chamber.

* * * * *